United States Patent
Nammi et al.

(10) Patent No.: US 9,774,379 B2
(45) Date of Patent: Sep. 26, 2017

(54) BEAM-FORMING IN A COMBINED RADIO CELL

(71) Applicant: TELEFONAKTIEBOLAGET L M ERICSSON (PUBL), Stockholm (SE)

(72) Inventors: Sairamesh Nammi, Kista (SE); Namir Lidian, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 163 days.

(21) Appl. No.: 14/739,038

(22) Filed: Jun. 15, 2015

(65) Prior Publication Data
US 2015/0372736 A1  Dec. 24, 2015

Related U.S. Application Data

(60) Provisional application No. 62/014,577, filed on Jun. 19, 2014.

(51) Int. Cl.
*H04B 7/06* (2006.01)
*H04W 16/28* (2009.01)
*H04B 7/0417* (2017.01)

(52) U.S. Cl.
CPC .......... *H04B 7/0617* (2013.01); *H04W 16/28* (2013.01); *H04B 7/0417* (2013.01)

(58) Field of Classification Search
CPC ................................. H04B 7/04; H04W 72/04
See application file for complete search history.

(56) References Cited

U.S. PATENT DOCUMENTS

| 2010/0091892 A1* | 4/2010 | Gorokhov | H04L 1/0026 375/260 |
| 2010/0120460 A1* | 5/2010 | Karlsson | H01Q 3/26 455/517 |
| 2011/0110337 A1* | 5/2011 | Grant | H04B 1/707 370/335 |
| 2011/0237272 A1* | 9/2011 | Gorokhov | H04B 7/024 455/452.1 |
| 2013/0215992 A1* | 8/2013 | Kazmi | H04B 7/0413 375/295 |

(Continued)

FOREIGN PATENT DOCUMENTS

EP  2930966 A1 * 1/2015

OTHER PUBLICATIONS

Ericsson, ST-Ericsson 'Analysis of Probing Pilots for Spatial Reuse Mode in Combined Cel! Deployment' In: 3GPP TSG RAN WG1 Meeting #72bis, R1-131540, Chicago, USA, Apr. 15-19, 2013, Apr. 6, 2013, XP050697327; whole document; Section 3.*

(Continued)

*Primary Examiner* — Charles C Jiang
*Assistant Examiner* — Kyaw Z Soe

(57) ABSTRACT

The present disclosure relates to radio communication and, more particularly, to beam-forming in a combined radio cell deployment. In one example embodiment, the disclosure presents a method performed by a network node operating in a combined radio cell, wherein the method comprises creating a probing pilot (e.g., a F-CPICH) which is multiplied with a beam-forming vector weight; and transmitting a first radio signal to a UE, the first radio signal comprising the created probing pilot multiplied with the beam-forming vector weight.

10 Claims, 10 Drawing Sheets

(56) References Cited

U.S. PATENT DOCUMENTS

| | | | | |
|---|---|---|---|---|
| 2014/0092787 A1* | 4/2014 | Han | ................ | H04W 52/0258 |
| | | | | 370/280 |
| 2015/0063493 A1* | 3/2015 | Tie | ..................... | H04B 1/0483 |
| | | | | 375/299 |
| 2015/0085954 A1* | 3/2015 | Han | ................... | H04B 7/0413 |
| | | | | 375/295 |
| 2015/0289147 A1* | 10/2015 | Lou | ................... | H04B 7/0408 |
| | | | | 370/329 |

OTHER PUBLICATIONS

Ericsson: 3GPP TSG-RAN WG1 #70bis; R1-124514; "Simulation Assumptions for Evaluating Heterogenous Networks;" San Diego, California, US; Oct. 8-12, 2012.

Huawei, Hisilicon: TSG RAN Meeting #57; "Proposed SID: Study on UMTS Heterogeneous Networks;" RP-121436; 3GPP Work Item Description; Chicago, Illinois, US; Sep. 4-7, 2012.

Ericsson: 3GPP TSG-RAN WG1 #70bis; R1-124513; "Heterogeneous Network Deploymnet Scenarios;" San Diego, California, US; Oct. 8-12, 2012.

* cited by examiner

BEAM-FORMING IN A COMBINED RADIO CELL

TECHNICAL FIELD

Embodiments of the technology presented herein generally relate to radio communication. More particularly, the embodiments presented herein relate to beam-forming in combined radio cell deployments. Methods performed by network nodes, and corresponding network nodes, operating in a combined radio cell are described.

BACKGROUND

This section is intended to provide a background to the various embodiments of the technology that are described in this disclosure. Therefore, unless otherwise indicated herein, what is described in this section should not be interpreted to be prior art by its mere inclusion in this section.

Radio communication networks are widely deployed to provide various communication services such as telephony, video, data, messaging, broadcasts, and so on. Such radio communication networks support communications for multiple user equipments (UEs) by sharing the available network resources. One example of such a network is the Universal Mobile Telecommunications System (UMTS), a third generation (3G) technology standardized by the 3rd Generation Partnership Project (3GPP). UMTS includes a definition for a Radio Access Network (RAN), referred to as UMTS Terrestrial Radio Access Network (UTRAN). The UMTS, which is the successor to Global System for Mobile Communications (GSM) technologies, supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications. For example, third-generation UMTS based on W-CDMA has been deployed in many places of the world. To ensure that this system remains competitive in the future, 3GPP began a project to define the long-term evolution of UMTS cellular technology. The specifications related to this effort are formally known as Evolved UMTS Terrestrial Radio Access (E-UTRA) and Evolved UMTS Terrestrial Radio Access Network (E-UTRAN), but are more commonly referred to by the name Long Term Evolution (LTE). More detailed descriptions of radio communication networks and systems can be found in literature, such as in Technical Specifications published by, e.g., the 3GPP.

Classical Versus Shared Radio Cell Deployments

In the following, the term point is used to mean a point having transmission and/or reception capabilities. As used herein, this term may interchangeably be referred to as "transmission point", "reception point", "transmission/reception point" or "node". To this end, it should also be appreciated that the term point may include devices such as radio network nodes (e.g. evolved NodeB (eNB), a Radio Network Controller (RNC), etc)) and radio units (e.g. Remote Radio Units (RRUs)). As is known among persons skilled in the art, radio network nodes generally differ from RRUs in that the radio network nodes have comparatively more controlling functionality. For example, radio network nodes typically include scheduler functionality, etc., whereas RRUs typically don't. Therefore, RRUs are typically consuming comparatively less computational power than radio network nodes. Sometimes, radio network nodes may therefore be referred to as high power points or high power nodes (HPN) whereas RRUs may be referred to as low power points or low power nodes (LPN). In some cell deployments, LPNs are referred to as pico points and HPNs are referred to as macro points. Thus, macro points are points having comparatively higher power than the pico points.

The classical way of deploying a network is to let different transmission/reception points form separate cells. That is, the signals transmitted from or received at a point is associated with a cell-id (e.g. a Physical Cell Identity (PCI)) that is different from the cell-id employed for other nearby points. Conventionally, each point transmits its own unique signals for broadcast (e.g., PBCH (Physical Broadcast Channel)) and sync channels (e.g., PSS (primary synchronization signal), SSS (secondary synchronization signal)). The classical way of utilizing one cell-id per point is depicted in FIG. 1 for a heterogeneous deployment where a number of LPNs are placed within the coverage area of a HPN. Note that similar principles also apply to classical macro-cellular deployments where all points have similar output power and perhaps are placed in a more regular fashion compared with the case of a heterogeneous deployment.

A recent alternative to the classical cell deployment is to let all the UEs within the geographical area outlined by the coverage of the HPN be served with signals associated with the same cell-id (e.g. the same Physical Cell Identity (PCI)). In other words, from a UE perspective, the received signals appear coming from a single cell. This is schematically illustrated in FIG. 2. Note that only one HPN is shown, other HPNs would typically use different cell-ids (corresponding to different cells) unless they are co-located at the same site. In the latter case of several co-located HPNs, the same cell-id may be shared across the co-located HPNs and those LPNs that correspond to the union of the coverage areas of the macro points. Sync channels, BCH (Broadcast Channels) and control channels may all be transmitted from the HPN while data can be transmitted to a UE also from LPNs by using shared data transmissions (e.g. a Physical Downlink Shared Channel (PDSCH)) relying on UE specific resources. In FIG. 2, the HPN may e.g. be radio network node such as a eNB. The LPNs may be radio units such as those commonly referred to as Remote Radio Units (RRUs).

The single cell-id approach, or combined radio cell deployment (aka shared radio cell deployment or soft radio cell deployment) can be geared towards situations in which there is fast backhaul communication between the points associated to the same cell. A typical case would be a radio network node serving one or more sectors on a macro level as well as having fast fiber connections to remote radio units (RRUs) playing the role of the other points sharing the same cell-id. Those RRUs could represent LPNs with one or more antennas each. Another example is when all the points have a similar power class with no single point having more significance than the others. The radio network node would then handle the signals from all RRUs in a similar manner.

An advantage of the combined cell approach compared with the classical approach is that the typically involved handover procedure between cells only needs to be invoked on a macro basis. Generally, there is also greater flexibility in coordination and scheduling among the points.

Transmission Modes in Combined Cell Deployment

There exist different transmission modes in a combined radio cell deployment. The different transmission modes can e.g. be divided into:

Single Frequency Network (SFN): In this mode, all nodes generally transmit the same pilot channel. Also, data and control information are transmitted from all nodes. In this mode, only one UE can be served from all the nodes at any time. Hence, this mode can be said to be useful for coverage improvements. Furthermore, this mode works for legacy UEs. As used in this disclosure the expression "legacy UE" is used to mean a UE that supports 3GPP Rel-5, Rel-6, Rel-7, Rel-8, Rel-9, Rel-10, and/or Rel-11. That is, the expression "legacy UE" refers to pre-release 12 UEs.

Node selection with Spatial Re-use: In this mode, even though all nodes transmit the same pilot channel, data and control information transmitted from one node may be different from the data and control information transmitted from other nodes. For example, a node may be serving a specific UE, while at the same time different data and control information may be sent to a different UE. Hence, the spatial resources can be reused. This mode thus allows for load balancing gains and, accordingly, the capacity of the combined radio cell can be increased.

In a combined radio cell deployment it is generally a radio network node (sometimes referred to as "the central radio network node" or "the central controller") that takes responsibility for collecting operational information, operational data or operational statistics from various measurements that are made throughout the combined radio cell. Typically, but not necessarily, the decision of which LPN node (e.g. RRU) that should transmit to a specific UE is made by this radio network node based on the collected operational information, operational data or operational statistics. The operational information, operational data or operational statistics may be collected (e.g. obtained, acquired, or received) from the various LPNs. Additionally, or alternatively, this operational information, operational data or operational statistics may be collected from the UEs that are present in the combined radio cell.

Pilots for Supporting Spatial Reuse Mode in a Combined Radio Cell

In a combined radio cell deployment it may be beneficial or useful to utilize additional pilots, i.e. pilots in addition to normal or regular pilots. As used herein "normal" or "regular" pilots refer to pilots such as common pilots. On the other hand, probing pilots (which will be further explained herein) is an example of an additional pilot within the context of this disclosure.

Additional pilots, such as the above-mentioned probing pilots, may be advantageous in a combined radio cell deployment for various reasons, for example:

Identifying which node is the best available (or best suitable) node for a particular UE: In a combined radio cell deployment, all the nodes transmit the same common pilot (C-PICH) and the UE computes, or otherwise determines, a channel quality indicator (CQI) on the basis of the received common pilots. Hence, the central node does not know where the UE is located or which nodes should transmit data to a particular UE. This may be seen as a similarity with cell selection in co-channel deployment, where the UE compares the pilot strengths of each node and decide which radio cell sector is the best available, or most suitable, for the UE in question. In a combined radio cell deployment, since all nodes have the same primary scrambling code, the UE cannot generally distinguish between individual pilots.

Data demodulation: In a combined radio cell deployment, a UE is receiving pilots (or pilot signals) from all the nodes for CQI for channel sounding (e.g., CQI computation), while data is transmitted from only one or a subset of nodes. Hence, the channel estimation for data demodulation may become erroneous if the UE would use channel estimation from combined P-CPICHs. In order to estimate the channel in a better way, it may be advantageous to utilize additional pilots, e.g. probing pilots.

Pilot Design Options

The 3GPP is studying various pilot design options. Two example pilot design options are described in R1-132603, "Overview of Spatial Reuse Mode in Combined Cell Deployment for Heterogeneous Networks", which was presented at the 3GPP RAN1#73 meeting in Fukuoka, Japan, $20^{th}$-$24^{th}$ of May, 2013. In brief, the first option (i.e. Option 1) introduces additional pilots in the form of probing pilots which can be transmitted continuously at a relatively low power level, whereas the other option (i.e. Option 2) uses demodulation pilots as probing pilots with a comparatively higher power. The first design option (i.e. Option 1) of R1-132603 will now be briefly described:

Separate probing and demodulation pilots: FIG. 3 illustrates a signaling diagram of example messages when utilizing separate probing and demodulation pilots. Assume that a combined radio cell deployment comprises four nodes (or transmission points, or antennas) serving multiple UEs. It should be appreciated that the same procedure is applicable also in scenarios where the number of nodes is less than or more than four. A reference signal which is unique to each node in a combined cell called Fractional CPICH (F-CPICH) is transmitted from each node simultaneously and continuously. The F-CPICH is generally characterized by a spreading code (typically SF=256 (SF is an abbreviation for Spreading Factor)) and a scrambling code which is either the primary scrambling code or a secondary scrambling code of the combined radio cell. The F-CPICH channel power levels may be indicated to the UE during the initial cell set up. In addition to F-CPICH, the primary common pilot (P-CPICH) which is common to all the nodes is continuously transmitted. From these two different pilot signals, the UE can estimate the channel and feed back the channel quality information (CQI) associated with these two pilots e.g. at two time intervals. Note that the CQI estimated with F-CPICH indicates the channel quality corresponding to the specific node, referred to hereafter as $CQI_F$, and the CQI computed using P-CPICH is the channel quality using the combined nodes, referred to hereafter as $CQI_F$. These two CQIs are typically, but not necessarily, time multiplexed and sent on the uplink feedback channel HS-DPCCH. The same HS-DPCCH signal is received by all the nodes. The central network node (e.g., a radio network node such as a RNC or eNB) can process the received signal (HS-DPCCH) from all the nodes. From $CQI_F$ the radio central network node identifies which node the UE is close to. Hence the central network node can inform a node in question to transmit to the UE. The assigned node transmits the demodulation pilot channel (D-CPICH), downlink control channel (HS-SCCH) and the downlink traffic channel (HS-PDSCH) to the respective UE. Similarly, the central network node informs the other nodes to transmit to the other UEs. Note that D-CPICH and F-CPICH use different spreading codes and may have different power levels. For example, the power level of F-CPICH may be relatively low and D-CPICH may be relatively high.

SUMMARY

It is in view of the above considerations and others that the various embodiments disclosed herein have been made.

The inventors have realized that, in a combined radio cell deployment, transmitting the same signal from each network node (or, antenna) may be inadequate. Or said differently, transmitting the same signal from each network node (or, antenna) may not provide any throughput improvement. This may, e.g., be due to the fact that each antenna has a random phase difference. Hence, when the same signal is transmitted through them; the resultant signal is a weighted sum of individual antenna branches. The weights are the random phases. Accordingly, the resultant signal may not be optimal for an individual UE. This, in turn, may be due to the fact that, for some UEs, the individual signals may be cancelled. This may cause wastage of power, thereby decreasing the achievable throughput.

In one of its aspects, the technology disclosed herein concerns a method performed by a network node operating in a combined radio cell. The method comprises: creating a first probing pilot (e.g., F-CPICH[1]) which is multiplied with a first beam-forming vector weight ($W_1$) of a list of available beam-forming weights; transmitting a first radio signal to a User Equipment, UE, the first radio signal comprising the created first probing pilot multiplied with the first beam-forming vector weight ($W_1$); receiving a second radio signal from the UE, the second radio signal comprising channel quality feedback information (e.g. a Channel Quality Indicator ($CQI_1$)) related to the first probing pilot multiplied with the first beam-forming vector ($W_1$); creating a second probing pilot (e.g., F-CPICH[1]) which is multiplied with a second beam-forming vector weight ($W_2$) of the list of available beam-forming vector weights; transmitting a third radio signal to the UE, the third radio signal comprising the created second probing pilot multiplied with the second beam-forming vector weight ($W_2$); receiving a fourth radio signal from the UE, the fourth radio signal comprising channel quality feedback information (e.g. a $CQI_2$) related to the second probing pilot multiplied with the second beam-forming vector weight ($W_2$); ranking the beam-forming vector weights ($W_1$, $W_2$) of the list of available beam-forming vector weights on the basis of the received channel quality feedback information (e.g. $CQI_1$, $CQI_2$); selecting one beam-forming vector weight from the list of available beam-forming vector weights on the basis of the ranking of the beam-forming vector weights; and utilizing only the selected beam-forming vector weight.

According to another aspect, the technology disclosed herein concerns a network node configured to operate in a combined radio cell. The network node comprises: means adapted to create a first probing pilot (e.g., F-CPICH[1]) which is multiplied with a first beam-forming vector weight ($W_1$) of a list of available beam-forming vector weights; means adapted to transmit a first radio signal to a User Equipment, UE, the first radio signal comprising the created first probing pilot multiplied with the first beam-forming vector weight ($W_1$); means adapted to receive a second radio signal from the UE, the second radio signal comprising channel quality feedback information (e.g. a Channel Quality Indicator ($CQI_1$)) related to the first probing pilot multiplied with the first beam-forming vector weight ($W_1$); means adapted to create a second probing pilot (e.g., F-CPICH[1]) which is multiplied with a second beam-forming vector weight ($W_2$) of the list of available beam-forming vector weights; means adapted to transmit a third radio signal to the UE, the third radio signal comprising the created second probing pilot multiplied with the second beam-forming vector weight ($W_2$); means adapted to receive a fourth radio signal from the UE, the fourth radio signal comprising channel quality feedback information (e.g. a $CQI_2$) related to the second probing pilot multiplied with the second beam-forming vector weight ($W_2$); means adapted to rank the beam-forming vector weights ($W_1$, $W_2$) of the list of available beam-forming vector weights on the basis of the received channel quality feedback information (e.g. $CQI_1$, $CQI_2$); means adapted to select one beam-forming vector weight from the list of available beam-forming vector weights on the basis of the ranking of the beam-forming vector weights; and means adapted to subsequently utilize only the selected beam-forming vector weight.

In another of its aspects, the technology disclosed herein concerns a method performed by a network node operating in a combined radio cell. The method comprises: creating a probing pilot (e.g., a F-CPICH) which is multiplied with a beam-forming vector weight (W); and transmitting a first radio signal to a User Equipment, UE, the first radio signal comprising the created probing pilot multiplied with the beam-forming vector weight (W).

According to yet another aspect, the technology disclosed herein concerns a network node which is configured to operate in a combined radio cell. The network node comprises: means adapted to create a probing pilot (e.g., a F-CPICH) which is multiplied with a beam-forming vector weight (W); and means adapted to transmit a first radio signal to a User Equipment, UE, the first radio signal comprising the created probing pilot multiplied with the beam-forming vector weight (W).

In yet another of its aspects, the technology disclosed herein concerns a method performed in a network node (or, in several network nodes) operating in a combined radio cell. The method comprises:

- Transmitting a probing pilot multiplied by weights chosen from a codebook (pre-defined), wherein the probing pilot is a pilot intended for requesting CQI from a UE;
- Transmitting these probing pilots multiplied by weights sequentially (e.g., only one weight vector is used at any given time)
- Obtaining (e.g. receiving, or acquiring) the CQI corresponding to the above-mentioned probing pilot(s) multiplied by the specific weight(s) chosen from the codebook;
- Choosing, or otherwise selecting, the best weight vector upon having received all the CQI:s
- Transmitting the demodulation pilot and data traffic channel and/or control channel multiplied by the chosen weight vector.

In yet another of its aspects, the technology disclosed herein concerns a method performed by a UE in a combined radio cell. The method comprises reporting channel quality feedback information (e.g. CQI) to the network node according to any one of the above aspects. This may be done sequentially. The technology described herein also concerns the corresponding UE, which is configured to perform, or otherwise execute, this method.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

Figure 1:
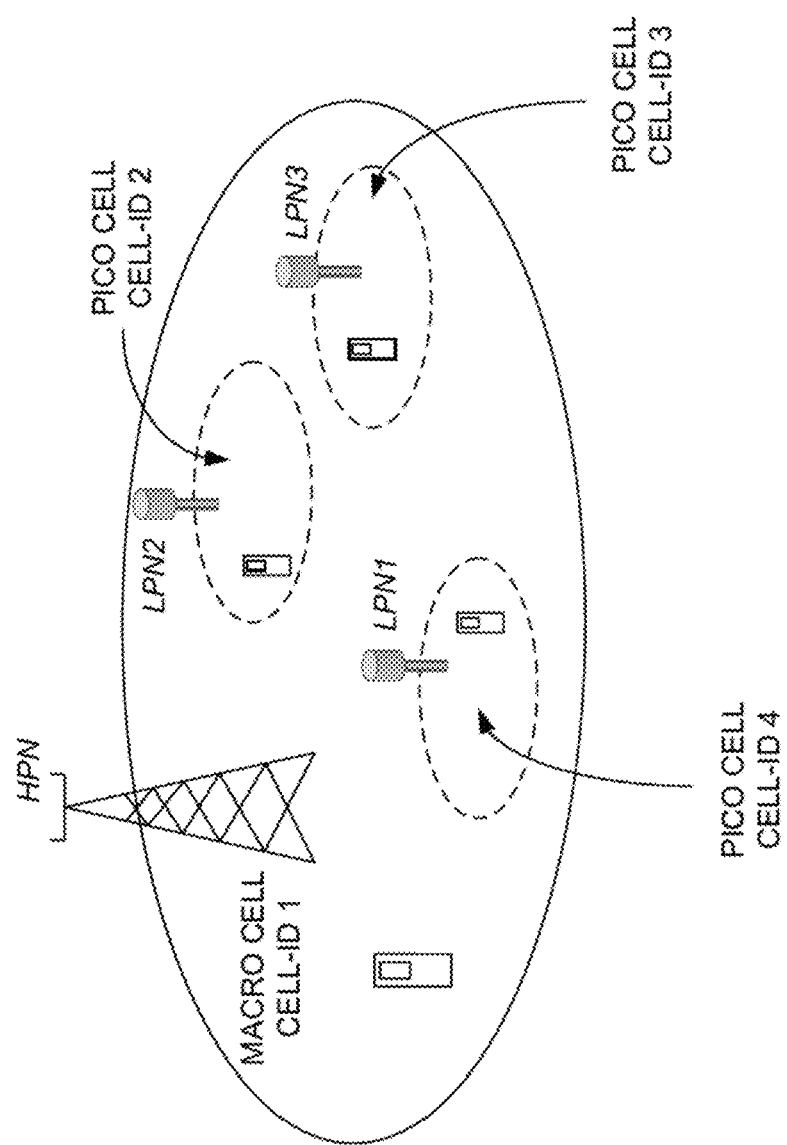
FIG. 1 shows an example of a heterogeneous radio network utilizing a classical cell deployment.

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art. Like reference numbers refer to like elements or method steps throughout the description.

As used in this disclosure, the term "user equipment (UE)" is used to mean any device, which can be used by a user to communicate. Also, the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC devices, which do not necessarily involve human interaction. In this regard, it should also be appreciated that the term "user equipment (UE)" as used herein may apply the definition as specified on page 33 of 3GPP TR 21.905 V.12.0.0 (2013-06). Furthermore, it should be appreciated that although terminology from 3GPP HSPA has been used in this disclosure to exemplify the various embodiments, this should not be seen as limiting. Other wireless systems, including LTE, LTE-Advanced, WiMax, UMB and GSM, may also benefit from exploiting the ideas covered within this disclosure. In some embodiments the non-limiting term radio network node or simply network node is used. It refers to any type of network node that serves a UE and/or is connected to other network nodes or network elements or any other radio node from where UE may receive a signal. Examples of a network nodes are e.g.: Node B's, base stations (BS:s), multi-standard radios (MSR's), eNodeBs, network controllers, radio network controllers (RNC's), base station controller (BSC's), relay nodes, donor nodes controlling relay nodes, base transceiver stations (BTS's), access points (APs), transmission points, transmission nodes, Remote Radio Units (RRU), Remote Radio Heads (RRHs), nodes in distributed antenna system (DAS), etc. The embodiments are described in particular for single carrier operation UTRA/HSPA. The embodiments are however applicable to any RAT or multi-RAT system where the UE operates using multiple carriers e.g. LTE FDD/TDD, GSM/GERAN, Wi-Fi, WLAN, WiMax, CDMA2000 etc. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

Some of the embodiments presented herein relies on the assumption that a UE is configured to demodulate a probing pilot and report a channel quality indicator (CQI). The probing pilot (F-CPICH), which is similar to S-CPICH, may be used for finding the optimal, or most suitable, beam-forming weights. The beam-forming may be done using a pre-defined codebook of weight elements. Assume for example that a codebook of length N is defined with beam-forming vectors (weights written in a vector form). Then the received signal due to probing pilot may be given by $$r_i = \sum_{j=1}^{N_p} \sqrt{L_j} \, H_j \sqrt{P_{pj}} \, x_p W_j^i + n \qquad (1)$$

Where $H_j$ is the channel between the $j^{th}$ node and the UE. It should be noted that the channel is represented by a Toeplitz matrix. The vector $x_p$ denotes the probing pilot chip sequence. The variable $P_{pj}$ is the transmitted power levels for the probing pilot from the $j^{th}$ node. The variable $L_j$ is the path gain from the $j^{th}$ node to the UE, and n is the additive white Gaussian noise which includes both the thermal noise and other-cell interference. The variable $N_p$ is the number of nodes/antennas in the combined cell.

Assume that the CQI feedback by the UE due to a certain pilot signal is e.g. $CQI_i$.

The process of providing the CQI feedback to the received signal due to a probing pilot is repeated N times with each element in the codebook. Hence a central node gets N CQI's. These may be denoted as: $CQI_i$, $CQI_2$ . . . , $CQI_n$.

Then, according to an example method, the best beam-forming vector is chosen from the codebook which maximizes the CQI. This beam-forming weight vector is used to beam-form data traffic channel and/or control channel for that specific UE.

Turning now to FIGS. 4-8, various example embodiments will be described.

Figure 4A:
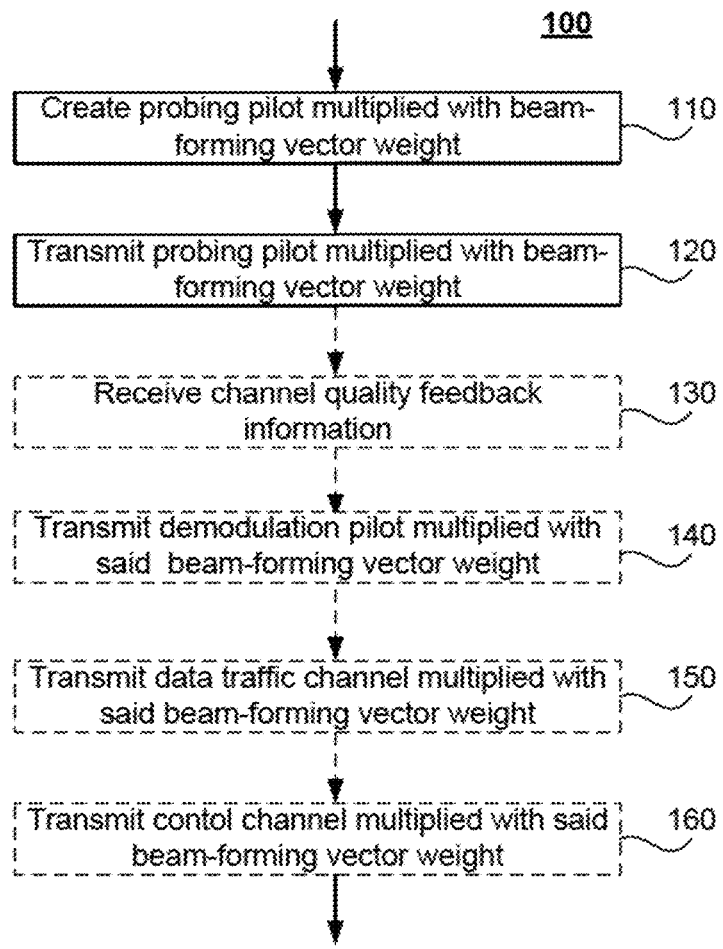
FIGS. 4A-4B are flowcharts of example embodiments of methods performed by a network node.
Figure 4B:
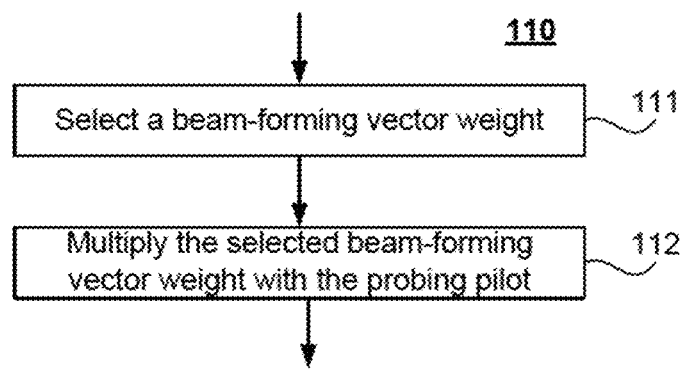

FIG. 4A illustrates a first embodiment of a method performed by a network node operating in a combined radio cell. The method comprises creating 110 a probing pilot (e.g., a F-CPICH, or other reference signal) which is multiplied with a beam-forming vector weight (W). The method also comprises transmitting 120 a first radio signal to a UE, wherein the first radio signal comprises the created probing pilot multiplied with the beam-forming vector weight (W). As can be seen in FIG. 4B, creating 110 the probing pilot multiplied with the beam-forming vector weight (W) may optionally comprise: selecting 111 the beam-forming vector weight (W) from a list of available beam-forming vector weights; and multiplying 112 the selected beam-forming vector weight (W) with the probing pilot.

Advantageously, but not necessarily, the list of available beam-forming vector weights may be provided in a pre-defined codebook which is accessible by the network node.

The method may further comprise receiving 130 a second radio signal from the UE, wherein the second radio signal comprises channel quality feedback information (e.g. a CQI).

Additionally, the method may comprise transmitting 140, to the UE, a demodulation pilot (e.g., a D-CPICH) multiplied with said beam-forming vector weight. Additionally, or alternatively, the method may comprise transmitting 150, to the UE, a data traffic channel (e.g., a HS-PDSCH) multiplied with said beam-forming vector weight. Additionally, or alternatively, the method may comprise transmitting 160, to the UE, a control channel (e.g., HS-SCCH) multiplied with said beam-forming vector weight.

With reference to FIG. 5, another example embodiment of a method performed by a network node operating in a combined radio cell will be briefly explained. The method comprises creating 210 a first probing pilot (e.g., F-CPICH$^1$) which is multiplied with a first beam-forming vector weight ($W_1$) of a list of available beam-forming weights. The method also comprises transmitting 220 a first radio signal to a UE, the first radio signal comprising the created first probing pilot multiplied with the first beam-forming vector weight ($W_1$). Moreover, the method comprises receiving 230 a second radio signal from the UE, the second radio signal comprising channel quality feedback information (e.g. a Channel Quality Indicator ($CQI_1$)) related to the first probing pilot multiplied with the first beam-forming vector ($W_1$). Furthermore, the method comprises creating 240 a second probing pilot (e.g., F-CPICH$^1$) which is multiplied with a second beam-forming vector weight ($W_2$) of the list of available beam-forming vector weights. Still further, the method comprises transmitting 250 a third radio signal to the UE, the third radio signal comprising the created second probing pilot multiplied with the second beam-forming vector weight ($W_2$). The method further comprises receiving 260 a fourth radio signal from the UE, the fourth radio signal comprising channel quality feedback information (e.g. a $CQI_2$) related to the second probing pilot multiplied with the second beam-forming vector weight ($W_2$). Still further, the method comprises ranking 270 the beam-forming vector weights ($W_1$, $W_2$) of the list of available beam-forming vector weights on the basis of the received channel quality feedback information (e.g. $CQI_1$, $CQI_2$). The method also comprises selecting 280 one beam-forming vector weight from the list of available beam-forming vector weights on the basis of the ranking of the beam-forming vector weights. Moreover, the method comprises utilizing 290 only the selected beam-forming vector weight.

Figure 5A:
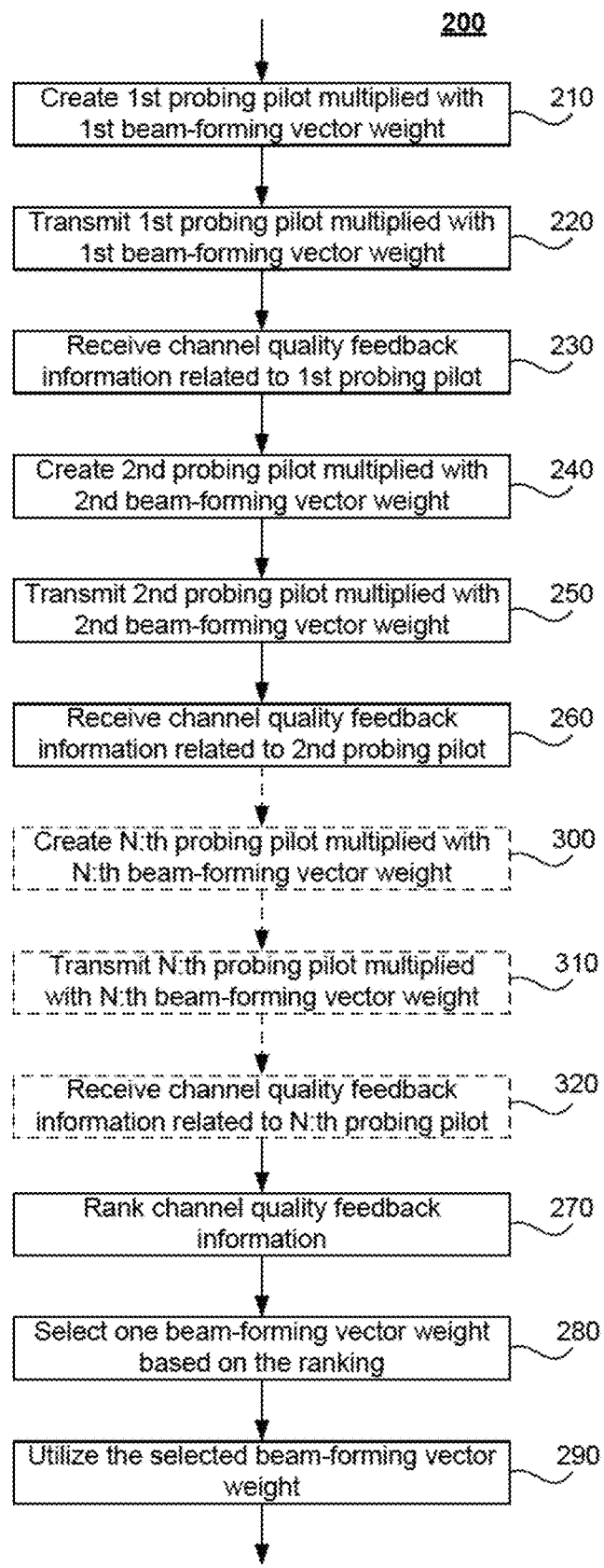
FIGS. 5A-5D are flowcharts of example embodiments of methods performed by a network node.
Figure 5B:
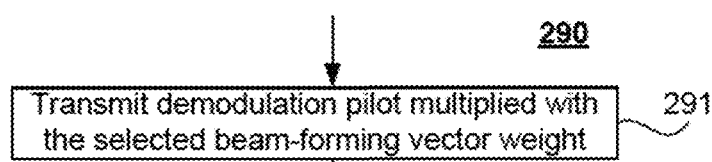

In some embodiments, the action, or method step, of utilizing 290 only the selected beam-forming vector weight comprises transmitting 291, to the UE, a demodulation pilot (e.g., a D-CPICH) multiplied with the selected beam-forming vector weight (see FIG. 5B).

Figure 5C:
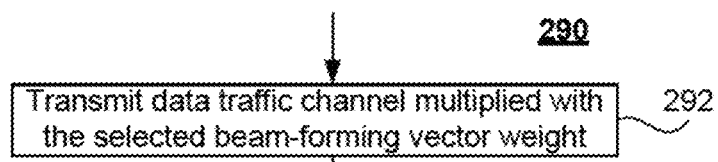

In some embodiments, the action, or method step, of utilizing 290 only the selected beam-forming vector weight comprises transmitting 292, to the UE, a data traffic channel (e.g., a HS-PDSCH) multiplied with the selected beam-forming vector weight (see FIG. 5C).

Figure 5D:
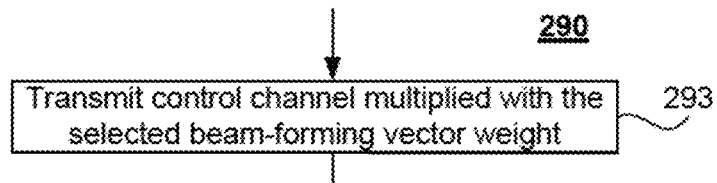

In some embodiments, the action, or method step, of utilizing 290 only the selected beam-forming vector weight comprises transmitting 293, to the UE, a control channel (e.g., a HS-SCCH) multiplied with the selected beam-forming vector weight (see FIG. 5D).

Returning to FIG. 5A, it should be appreciated that N number of probing pilots may be used. N is an integer. N could e.g. be 3, 4, 5, 6, 7, 8, 9, 10, etcetera.

Accordingly, the method may additionally comprise creating 300 a N:th probing pilot which is multiplied with a N:th beam-forming vector weight ($W_N$) of the list of available beam-forming vector weights. The method may also comprise transmitting 310 another radio signal to the UE, the another radio signal comprising the created N:th probing pilot multiplied with the N:th beam-forming vector weight ($W_N$). The method further comprises receiving 320 yet another radio signal from the UE, the yet another radio signal comprising channel quality feedback information (e.g. a $CQI_N$) related to the N:th probing pilot multiplied with the N:th beam-forming vector weight ($W_N$). Also, the method comprises ranking 270 the beam-forming vector weights ($W_1$, $W_2$, ..., $W_N$) of the list of available beam-forming vector weights on the basis of the received channel quality feedback information (e.g. $CQI_1$, $CQI_2$, ..., $CQI_N$). Still further, the method may comprise selecting 280 one beam-forming vector weight from the list of available beam-forming vector weights on the basis of the ranking of all N beam-forming vector weights. The method may also comprise subsequently utilizing 290 only the selected beam-forming vector weight.

Also, it should be appreciated that he list of available beam-forming vector weights is provided in a pre-defined codebook which is accessible by the network node.

Figure 6A:
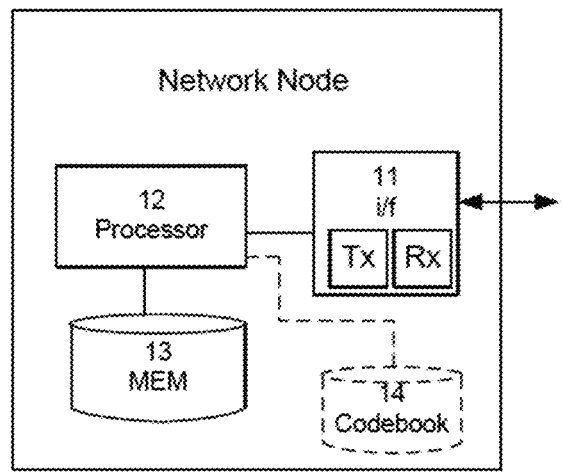
FIGS. 6A-6B illustrate different example embodiments of a network node.
Figure 6B:
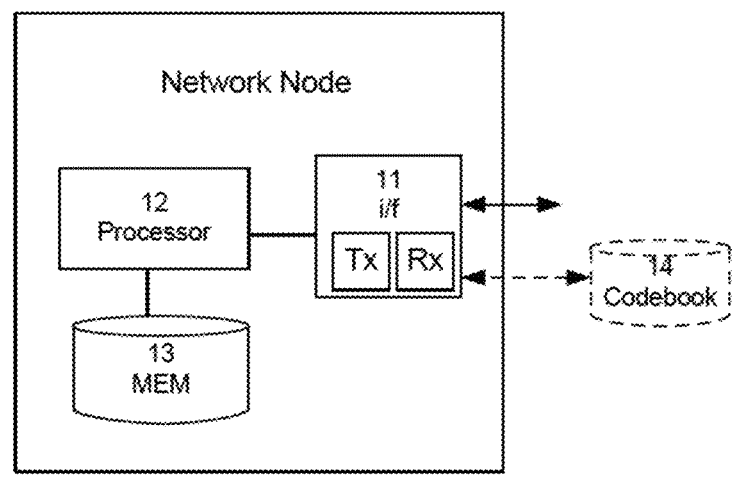

FIG. 6A illustrates a first embodiment of a network node 10, which is adapted to perform, or otherwise execute, one or more of the example methods described hereinabove with respect to FIGS. 4 and 5.

Figure 2:
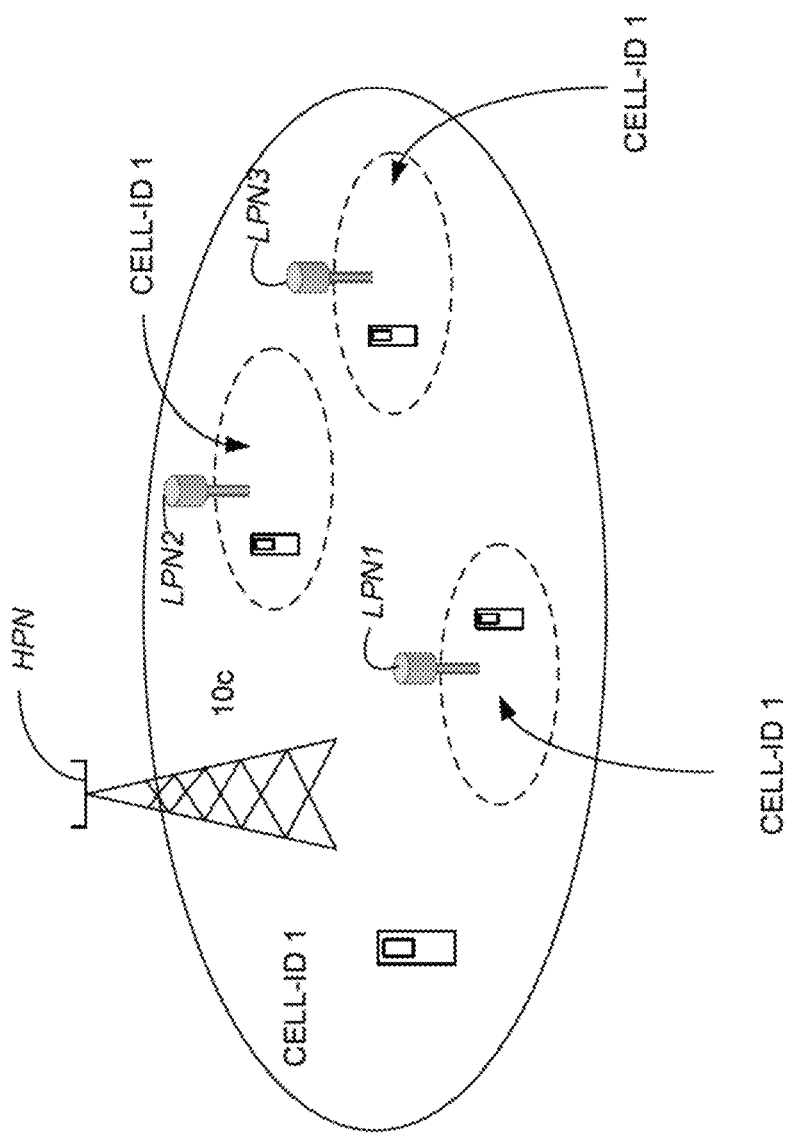
FIG. 2 shows an example of a heterogeneous radio network utilizing a combined cell deployment.
Figure 3:
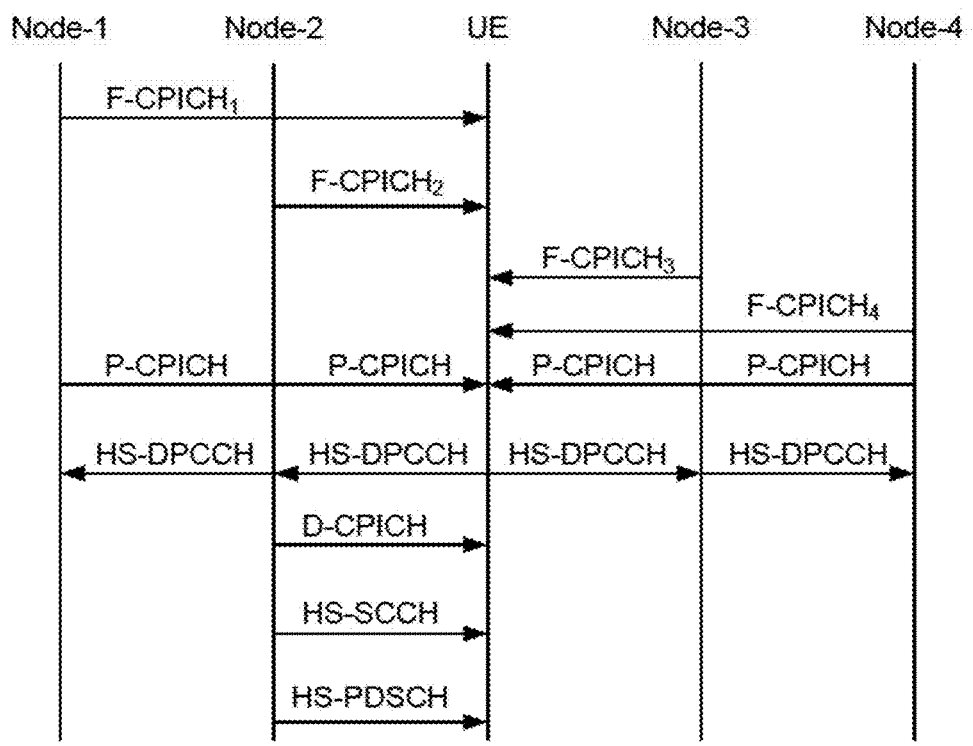
FIG. 3 is a message sequence chart showing messages between nodes and a UE using F-CPICH.

In a first embodiment, the network node 10 is configured to operate in a combined radio cell (see e.g. FIG. 2). The network node comprises means 12, 13 adapted to create a probing pilot (e.g., a F-CPICH, or other reference signal) which is multiplied with a beam-forming vector weight (W). In one example implementation, the means 12, 13 adapted to create the probing pilot which is multiplied with the beam-forming vector weight is implemented by means of a processor 12 and a memory 13. The memory 13 may thus store computer program code, which, when run in the processor 12 causes the network node 10 to create the probing pilot (e.g., a F-CPICH) which is multiplied with the beam-forming vector weight (W). The network node also comprises means 11 adapted to transmit a first radio signal to a UE, wherein the first radio signal comprises the created probing pilot multiplied with the beam-forming vector weight (W). The means denoted 11 may be implemented by a communications interface 11. The means 11 adapted to transmit the first radio signal to the UE may be implemented by means of a transmitter (Tx) 11.

In some embodiments, the network node comprises means 12, 13 adapted to select the beam-forming vector weight (W) from a list of available beam-forming vector weights. In an example implementation, the means 12, 13 adapted to select the beam-forming vector weight (W) from the list of available beam-forming vector weights is implemented by means of the processor 12 and the memory 13. The memory 13 may thus comprise computer program code, which, when run in the processor 12 causes the network node 10 to select the beam-forming vector weight (W) from the list of available beam-forming vector weights. Furthermore, means 12, 13 adapted to multiply the selected beam-forming vector weights (W) with the probing pilot may be provided. The means 12, 13 adapted to multiply the selected beam-forming vector weights (W) with the probing pilot may be implemented by means of the processor 12 and the memory 13. The memory 13 may thus comprise computer program code, which, when run in the processor 12 causes the network node 10 to multiply the selected beam-forming vector weights (W) with the probing pilot.

The list of available beam-forming vector weights may be provided in a pre-defined codebook 14 which is accessible by the network node 10. In one example implementation, the codebook 14 is provided internally in the network node 10 (see FIG. 6A). In an alternative implementation, the codebook 14 is external to the network node 10 (see FIG. 6B). If the codebook 14 is external, the codebook 14 may be accessed by the network node 10 via its communications interface 11.

The network node 10 may further comprise means 11 adapted to receive a second radio signal from the UE, wherein the second radio signal comprises channel quality feedback information (e.g. a Channel Quality Indicator (CQI)). In one example implementations said means 11 adapted to receive the second radio signal from the UE may be implemented by means of a receiver (Rx) 11.

The network node 10 may further comprise means 11 (e.g., the transmitter (Tx)) adapted to transmit, to the UE, a demodulation pilot (e.g., a D-CPICH) multiplied with said beam-forming vector weight. Additionally, or alternatively, the network node 10 may further comprise means 11 (e.g., the transmitter (Tx)) adapted to transmit, to the UE, a data traffic channel (e.g., a HS-PDSCH) multiplied with said beam-forming vector weight. The network node 10 may additionally, or alternatively, comprise means 11 (e.g., the transmitter (Tx)) adapted to transmit, to the UE, a control channel (e.g., a HS-SCCH) multiplied with said beam-forming vector weight.

In a second embodiment, the network node 10 comprises means 12, 13 adapted to create a first probing pilot (e.g., F-CPICH$^1$) which is multiplied with a first beam-forming vector weight ($W_1$) of a list of available beam-forming vector weights. The list of available beam-forming vector weights may be provided in a pre-defined codebook 14 which is accessible by the network node 10. The codebook may be internal (see FIG. 6A) or external (see FIG. 6B). The means 12, 13 adapted to create the first probing pilot (e.g., F-CPICH$^1$) which is multiplied with the first beam-forming vector weight ($W_1$) of the list of available beam-forming vector weights may be implemented by means of the processor 12 and the memory 13. The memory 13 may thus comprise computer program code, which, when run in the processor 12 causes the network node 10 to create the first probing pilot (e.g., F-CPICH$^1$) which is multiplied with the first beam-forming vector weight ($W_1$) of the list of available beam-forming vector weights.

Means 11 (e.g., the transmitter (Tx)) adapted to transmit a first radio signal to a UE are also provided. The first radio signal comprises the created first probing pilot multiplied with the first beam-forming vector weight ($W_1$).

Means 11 (e.g., the receiver (Rx)) adapted to receive a second radio signal from the UE are also provided. The second radio signal comprises channel quality feedback information (e.g. a Channel Quality Indicator ($CQI_1$)) related to the first probing pilot multiplied with the first beam-forming vector weight ($W_1$).

Still further, the network node comprises means 12, 13 adapted to create a second probing pilot (e.g., F-CPICH$^1$) which is multiplied with a second beam-forming vector weight ($W_2$) of the list of available beam-forming vector weights. The means 12, 13 adapted to create the second probing pilot (e.g., F-CPICH$^1$) which is multiplied with the second beam-forming vector weight ($W_1$) of the list of available beam-forming vector weights may be implemented by means of the processor 12 and the memory 13. The memory 13 may thus comprise computer program code, which, when run in the processor 12 causes the network node 10 to create the second probing pilot (e.g., F-CPICH$^1$) which is multiplied with the second beam-forming vector weight ($W_1$) of the list of available beam-forming vector weights.

Means 11 (e.g. the transmitter (Tx)) adapted to transmit a third radio signal to the UE are also provided. The third radio signal comprises the created second probing pilot multiplied with the second beam-forming vector weight ($W_2$).

Means 11 (e.g., the receiver (Rx)) adapted to receive a fourth radio signal from the UE are also provided. The fourth radio signal comprises channel quality feedback information (e.g. a $CQI_2$) related to the second probing pilot multiplied with the second beam-forming vector weight ($W_2$).

The network node 10 also comprises means 12, 13 adapted to rank the beam-forming vector weights ($W_1$, $W_2$) of the list of available beam-forming vector weights on the basis of the received channel quality feedback information (e.g. $CQI_1$, $CQI_2$). In one example implementation, the means 12, 13 adapted to rank the beam-forming vector weights ($W_1$, $W_2$) of the list of available beam-forming vector weights on the basis of the received channel quality feedback information are implemented by means of the processor 12 and the memory 13. The memory 13 may hence store computer program code which, when run in the processor 12, causes the network node 10 to rank the beam-forming vector weights ($W_1$, $W_2$) of the list of available beam-forming vector weights on the basis of the received channel quality feedback information (e.g. $CQI_1$, $CQI_2$).

The network node 10 also comprises means 12, 13 adapted to select one beam-forming vector weight from the list of available beam-forming vector weights on the basis of the ranking of the beam-forming vector weights. In one example implementation, the means 12, 13 adapted to select one beam-forming vector weight from the list of available beam-forming vector weights on the basis of the ranking of the beam-forming vector weights are implemented by means of the processor 12 and the memory 13. For example, the memory 13 may thus store computer program code which, when run in the processor 12, causes the network node 10 to select one beam-forming vector weight from the list of available beam-forming vector weights on the basis of the ranking of the beam-forming vector weights.

Furthermore, the network node 10 comprises means 11 adapted to subsequently utilize only the selected beam-forming vector weight. For example, the network node 10 may comprise means 11 (e.g. the transmitter (Tx)) adapted to transmit, to the UE, a demodulation pilot (e.g., a D-CPICH) multiplied with the selected beam-forming vector weight. Additionally, or alternatively, the network node 10 may comprise means 11 (e.g. the transmitter (Tx)) adapted to transmit, to the UE, a data traffic channel (e.g., a HS-PDSCH) multiplied with the selected beam-forming vector weight. Additionally, or alternatively, the network node 10 may comprise means 11 (e.g. the transmitter (Tx)) adapted to transmit, to the UE, a control channel (e.g., a HS-SCCH) multiplied with the selected beam-forming vector weight.

As will be appreciated, the network node 10 may also comprise means 12, 13 adapted to create a N:th probing pilot which is multiplied with a N:th beam-forming vector weight ($W_N$) of the list of available beam-forming vector weights. The means 12, 13 adapted to create a N:th probing pilot which is multiplied with a N:th beam-forming vector weight ($W_N$) of the list of available beam-forming vector weights may implemented by means of the processor 12 and the memory 13. For instance, the memory 13 may store computer program code which, when run in the processor 12, causes the network node 10 to create a N:th probing pilot which is multiplied with a N:th beam-forming vector weight ($W_N$) of the list of available beam-forming vector weights.

Furthermore, means 11 (e.g., the transmitter (Tx)) adapted to transmit another radio signal to the UE are provided. This another radio signal comprises the created N:th probing pilot multiplied with the N:th beam-forming vector weight ($W_N$).

Still further, means 11 (e.g., the receiver (Rx)) adapted to receive yet another radio signal from the UE are provided. This yet another radio signal comprises channel quality feedback information (e.g. a $CQI_N$) related to the N:th probing pilot multiplied with the N:th beam-forming vector weight ($W_N$).

Moreover, the network node 10 comprises means 12, 13 adapted to rank the beam-forming vector weights ($W_1$, $W_2$, ..., $W_N$) of the list of available beam-forming vector weights on the basis of the received channel quality feedback information (e.g. $CQI_1$, $CQI_2$, ..., $CQI_N$). In one example implementation, the means 12, 13 adapted to rank the beam-forming vector weights of the list of available beam-forming vector weights on the basis of the received channel quality feedback information are implemented by means of a processor 12 and a memory 13. The memory 13 may thus store compute program code which, when run in the processor 12, causes the network node 10 to rank the beam-forming vector weights ($W_1$, $W_2$, ..., $W_N$) of the list of available beam-forming vector weights on the basis of the received channel quality feedback information (e.g. $CQI_1$, $CQI_2$, ..., $CQI_N$).

Yet further, the network node 10 comprises means 12, 13 adapted to select one beam-forming vector weight from the list of available beam-forming vector weights on the basis of the ranking of all N beam-forming vector weights. In one example implementation, the means 12, 13 adapted to select one beam-forming vector weight from the list of available beam-forming vector weights on the basis of the ranking of all N beam-forming vector weights are implemented by means of the processor 12 and the memory 13. The memory 13 may hence store computer program code which, when run in the processor 12, cause the network node 10 to select one beam-forming vector weight from the list of available beam-forming vector weights on the basis of the ranking of all N beam-forming vector weights.

Again, the means 11 (e.g. the transmitter (Tx)) is adapted to subsequently utilize only the selected beam-forming vector weight, as described earlier.

Figure 7:
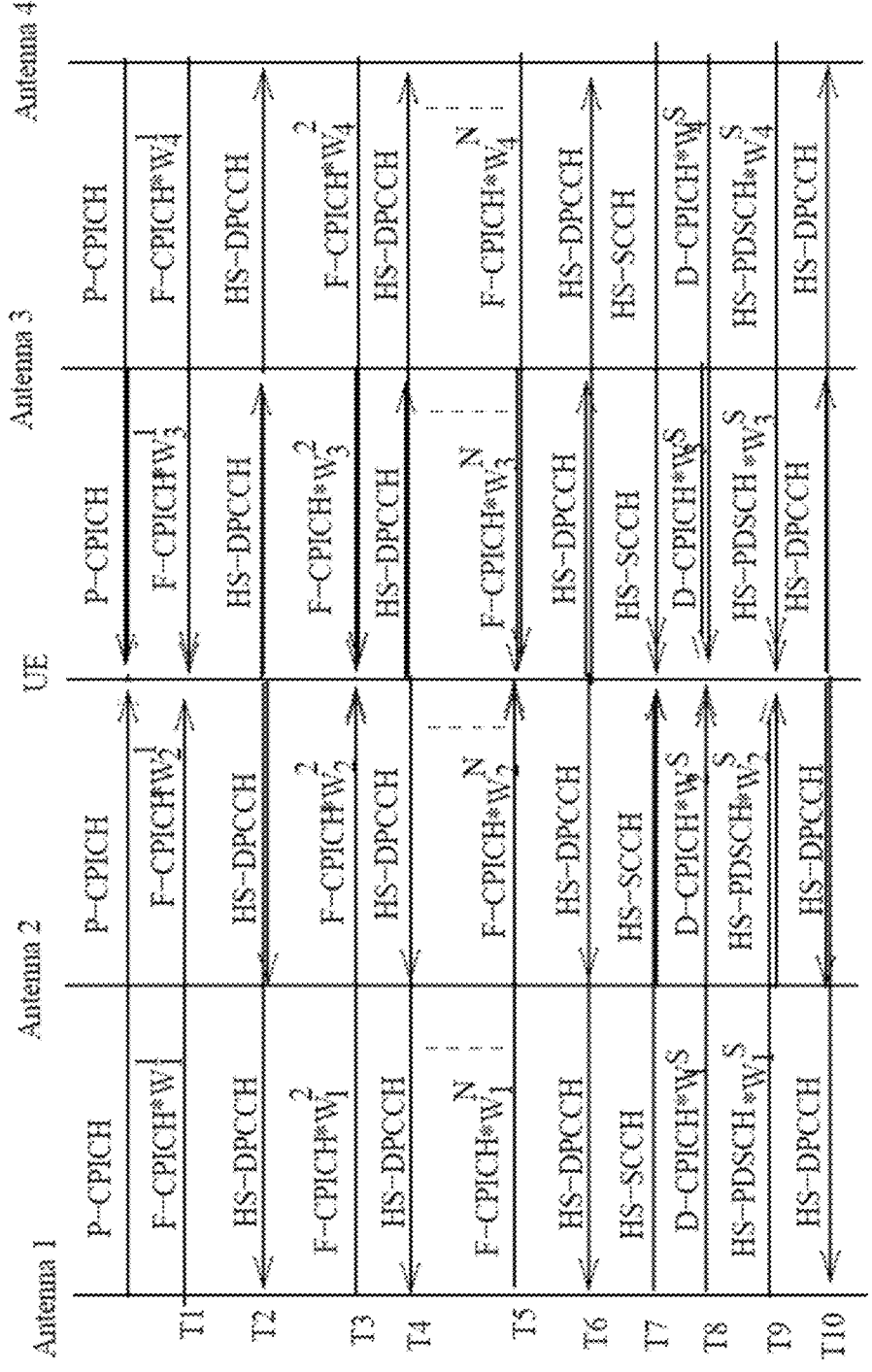
FIG. 7 is a message sequence chart between network nodes (antennas) and the UE when beam-forming weights are applied only for HS-PDSCH.

In addition to the example implementations described with reference to FIGS. 4-5, the inventors also propose the following example methods:

1. Proposed Methods for Achieving Beam-Forming Gain
A. Beam-forming for data traffic channel: FIG. 7 shows a message sequence chart of a proposed example method. Assume that a combined cell deployment comprises 4 network nodes (or, antennas), denoted as Antenna 1-4, each serving one or several UEs. It should be appreciated that the same, or essentially the same, procedure applies also if the number of network nodes is more than 4 or less than 4. It should also be noted that only a single UE is shown in FIG. 7, although the example method is of course not restricted to a single UE. It should also be noted that during the cell setup the UE may obtain the radio configuration parameters from the network (e.g. from a RNC or any one of the network nodes). This is not shown in the message sequence chart. The primary common pilot (P-CPICH) is transmitted from all the network nodes continuously. The probing pilot (F-CPICH) is multiplied by each element of a pre-defined precoding codebook. For example, using the illustrated 4 antennas, the precoding codebook as defined in 3GPP TS 25.212 for Release-11 (see e.g. Table 14b.7. in section 4.6d.2.7) 4 branch MIMO may be used. The probing is generally done using sequential time multiplexing. That is, at time instance T1, F-CPICH is multiplied with beam-forming vector weight 1. The UE reports the CQI that correspond to this weight using HS-DPCCH channel. At time instance T3, the F-CPICH is multiplied by a second beam-forming vector weight and the corresponding CQI is received at time instance T4. The process may be repeated until the central node (sometimes referred to as the central controller or central network node) receives, or otherwise obtains, all the CQIs corresponding to all of the elements in the pre-coding codebook (see Time T6 in FIG. 7). Then, the central network node chooses, or otherwise selects, the beam-forming vector weight which maximizes the CQI. With the selected beam-forming vector, the data channel is multiplied with the beam-forming vector when the UE is scheduled (Time T8). Since the UE needs to estimate the beam-formed channel, a new demodulation pilot may be transmitted multiplied by the chosen pre-coding weight vector (Time T7), which uses the same beam-forming vector as that of HS-PDSCH. Hence the UE estimates the pre-coded channel from D-CPICH and uses this for demodulating HS-PDSCH.

Figure 8:
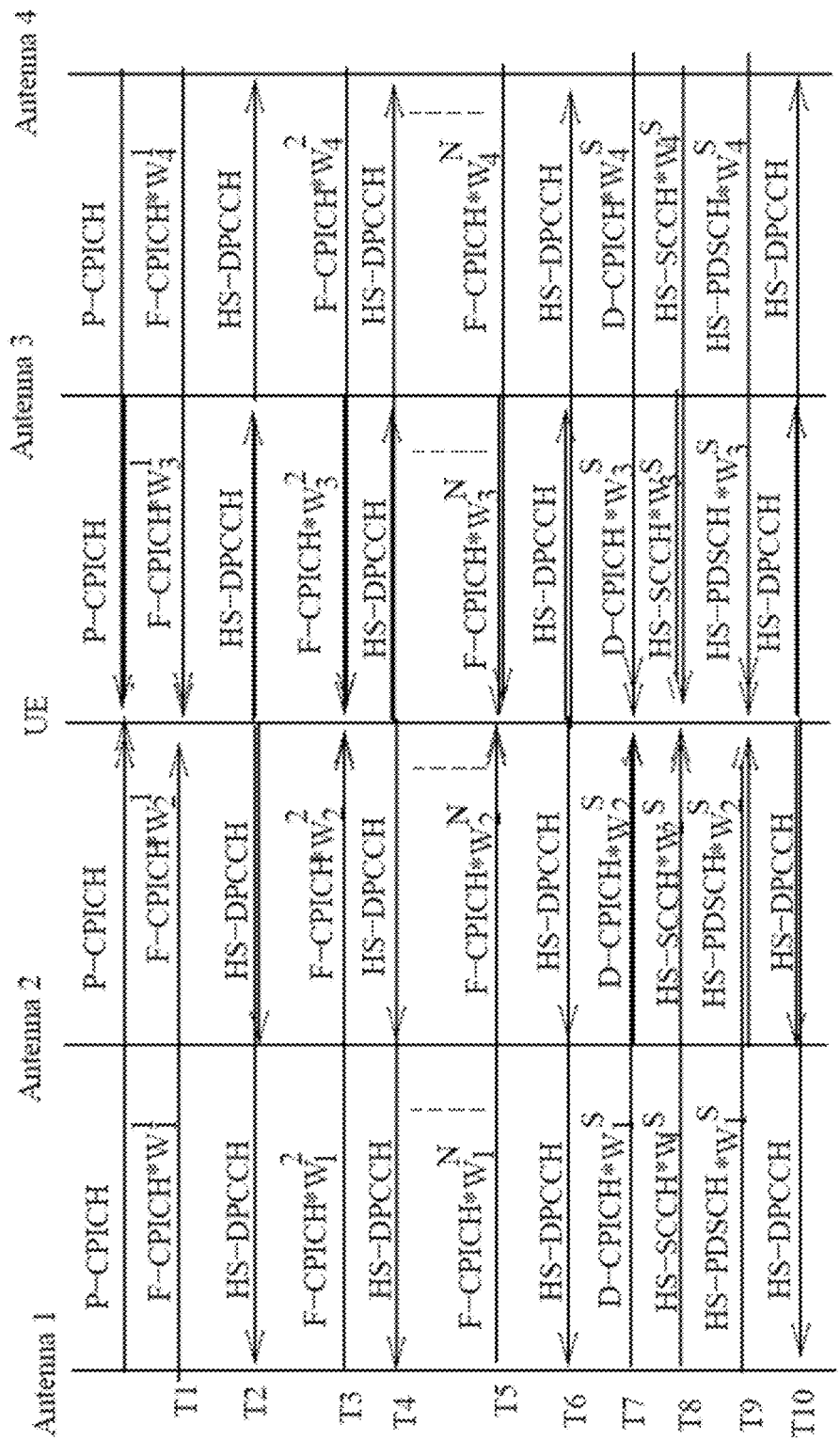
FIG. 8 is a message sequence chart between network nodes (antennas) and the UE when beam-forming weights are applied for both HS-SCCH and HS-PDSCH.

B. Beam-forming for Control Channel: FIG. 8 shows a message sequence chart when the same principle as above is applied for the downlink control channel (see HS-SCCH at time T8).

2. Proposed Methods for Achieving Beam-Forming Gain with Large Number of Code Book Elements As explained above with reference to sections 1A and 1B above, in sequential probing a single pilot may be used to probe the UE with different phase shifts in a codebook. However, when the number of elements in the codebook (Large N) is large, the suitable (e.g., optimal within the codebook) channel quality feedback by the UE might be outdated, which results in packet errors. Hence, there is a risk for loss in throughput.

According to the proposed example method, the central network node may be configured to determine, or otherwise decide, the best pre-coding vector weight and the suitable CQI without waiting for all the probing CQIs. Thereby, it is made possible to avoid, or at least reduce, potential link adaptation errors. The following example explains the proposed example method:

Assume that the pre-coding codebook has length of 16 elements. Then in the example method described in section 1 hereinabove, the network node (e.g. a NodeB) typically has to wait for 16 measurements (e.g. CQI) from UE. Then the network node decides, or determines, the best pre-coding vector and the corresponding CQI (e.g., the maximum CQI). This same CQI and the pre-coding vector may be used until the next decision time interval. It should be noted that the minimum value of the decision time interval is 16 TTIs. For example, assume that during the first probing decision, the network node decides to choose the pre-coding index 2. Then until 32 TTI, the same pre-coding index may be used for beam-forming and the corresponding CQI may be used for scheduling modulation and the transport block size.

In the proposed method, the network node may choose the pre-coding and the corresponding CQI without waiting for all the measurement reports from the UE.

Taking the same example, assume that during the first probing period pre-coding vector 2 is the best pre-coding vector. Then assume that at TTI 18, the CQI corresponding to the pre-coding vector 3 is greater than the CQI corresponding to the pre-coding vector 2 of the previous measurement (the selected pre-coding vector), then the network node may use this CQI and the pre-coding vector as the optimal one for the rest of the probing period, unless the CQI belonging to the other pre-coding vectors is better than the chosen pre-coding vector. By dynamically updating the CQI and the PCI, the channel can be tracked properly, thereby providing gains, e.g. even when the UE moves with high speed.

Figure 9:
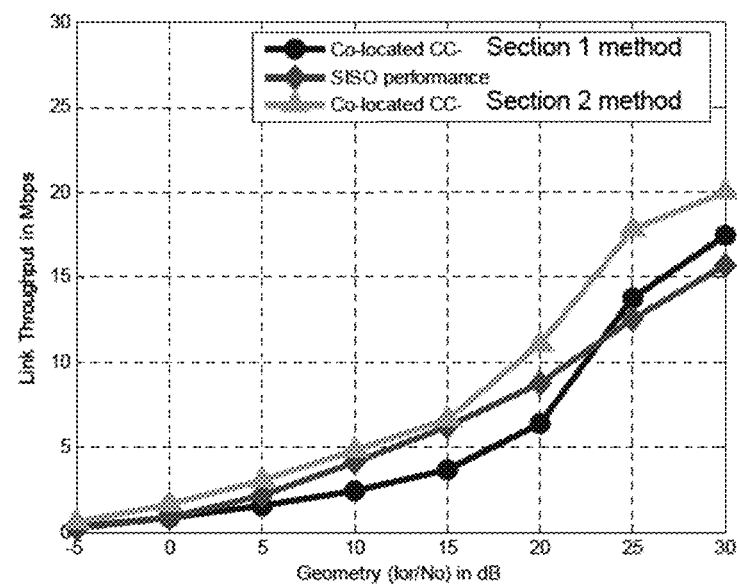
FIG. 9 illustrates a link throughput comparison.

FIG. 9 shows the link throughput with the example method described in section 1 and the proposed example method of section 2 when the number of elements in the codebook is taken as 16. For reference, the performance of single input single output (SISO) without beam-forming has also been sketched.

A non-exhaustive list of advantages of one or more aspects of the methods, network nodes and other devices described in this disclosure include:
1. Provides beam-forming gain. In turn, the overall capacity and performance can be improved.
2. Provides energy efficiency. Data may be beam-formed such that it causes less inter-cell interference.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Selected Example Embodiments

The technology disclosed herein thus encompasses without limitation the following example embodiments:

Example embodiment M1: A method (100) performed by a network node operating in a combined radio cell, the method comprising:
   creating (110) a probing pilot (e.g., a F-CPICH or a reference signal) which is multiplied with a beam-forming vector weight (W); and
   transmitting (120) a first radio signal to a User Equipment, UE, the first radio signal comprising the created probing pilot multiplied with the beam-forming vector weight (W).

Example embodiment M2: The method according to example embodiment M1, wherein creating (110) the probing pilot multiplied with the beam-forming vector weight (W) comprises:
   selecting (111) the beam-forming vector weight (W) from a list of available beam-forming vector weights; and
   multiplying (112) the selected beam-forming vector weight (W) with the probing pilot.

Example embodiment M3: The method according to example embodiment M2, wherein the list of available beam-forming vector weights is provided in a pre-defined codebook which is accessible by the network node.

Example embodiment M4: The method according to example embodiment M1, M2 or M3, further comprising:
   receiving (130) a second radio signal from the UE, the second radio signal comprising channel quality feedback information (e.g. a Channel Quality Indicator (CQI)) for the probing pilot.

Example embodiment M5: The method according to example embodiment M4, further comprising:
   transmitting (140), to the UE, a demodulation pilot (e.g., a D-CPICH) multiplied with said beam-forming vector weight.

Example embodiment M6: The method according to example embodiment M4 or M5, further comprising:
   transmitting (150), to the UE, a data traffic channel (e.g., a HS-PDSCH) multiplied with said beam-forming vector weight.

Example embodiment M7: The method according to example embodiment M4, M5 or M6, further comprising:
   transmitting (160), to the UE, a control channel (e.g., HS-SCCH) multiplied with said beam-forming vector weight.

Example embodiment M8: A method (200) performed by a network node operating in a combined radio cell, the method comprising:
   creating (210) a first probing pilot (e.g., F-CPICH[1]) which is multiplied with a first beam-forming vector weight ($W_1$) of a list of available beam-forming weights;
   transmitting (220) a first radio signal to a User Equipment, UE, the first radio signal comprising the created first probing pilot multiplied with the first beam-forming vector weight ($W_1$);
   receiving (230) a second radio signal from the UE, the second radio signal comprising channel quality feedback information (e.g. a Channel Quality Indicator ($CQI_1$)) related to the first probing pilot multiplied with the first beam-forming vector ($W_1$);

creating (240) a second probing pilot (e.g., F-CPICH¹) which is multiplied with a second beam-forming vector weight ($W_2$) of the list of available beam-forming vector weights;

transmitting (250) a third radio signal to the UE, the third radio signal comprising the created second probing pilot multiplied with the second beam-forming vector weight ($W_2$);

receiving (260) a fourth radio signal from the UE, the fourth radio signal comprising channel quality feedback information (e.g. a $CQI_2$) related to the second probing pilot multiplied with the second beam-forming vector weight ($W_2$);

ranking (270) the beam-forming vector weights ($W_1$, $W_2$) of the list of available beam-forming vector weights on the basis of the received channel quality feedback information (e.g. $CQI_1$, $CQI_2$);

selecting (280) one beam-forming vector weight from the list of available beam-forming vector weights on the basis of the ranking of the beam-forming vector weights; and utilizing (290) only the selected beam-forming vector weight.

Example embodiment M9: The method according to example embodiment M8, wherein utilizing (290) only the selected beam-forming vector weight comprises:

transmitting (291), to the UE, a demodulation pilot (e.g., a D-CPICH) multiplied with the selected beam-forming vector weight; and/or transmitting (292), to the UE, a data traffic channel (e.g., a HS-PDSCH) multiplied with the selected beam-forming vector weight; and/or transmitting (293), to the UE, a control channel (e.g., a HS-SCCH) multiplied with the selected beam-forming vector weight.

Example embodiment M10: The method according to example embodiment M8 or M9, further comprising:

creating (300) a N:th probing pilot which is multiplied with a N:th beam-forming vector weight ($W_N$) of the list of available beam-forming vector weights;

transmitting (310) another radio signal to the UE, the another radio signal comprising the created N:th probing pilot multiplied with the N:th beam-forming vector weight ($W_N$);

receiving (320) yet another radio signal from the UE, the yet another radio signal comprising channel quality feedback information (e.g. a $CQI_N$) related to the N:th probing pilot multiplied with the N:th beam-forming vector weight ($W_N$);

ranking (270) the beam-forming vector weights ($W_1$, $W_2$, ..., $W_N$) of the list of available beam-forming vector weights on the basis of the received channel quality feedback information (e.g. $CQI_1$, $CQI_2$, ..., $CQI_N$);

selecting (280) one beam-forming vector weight from the list of available beam-forming vector weights on the basis of the ranking of all N beam-forming vector weights; and subsequently utilizing (290) only the selected beam-forming vector weight.

Example embodiment M11: The method according to example embodiment M10, wherein utilizing only the selected beam-forming vector comprises:

transmitting (291), to the UE, a demodulation pilot (e.g., a D-CPICH) multiplied with the selected beam-forming vector weight; and/or transmitting (292), to the UE, a data traffic channel (e.g., a HS-PDSCH) multiplied with the selected beam-forming vector weight; and/or transmitting (293), to the UE, a control channel (e.g., a HS-SCCH) multiplied with the selected beam-forming vector weight.

Example embodiment M12: The method according to any one of example embodiments M8-M11, wherein the list of available beam-forming vector weights is provided in a pre-defined codebook which is accessible by the network node.

Example embodiment N1: A network node (10) which is configured to operate in a combined radio cell, the network node comprising:

means (12, 13) adapted to create a probing pilot (e.g., a F-CPICH) which is multiplied with a beam-forming vector weight (W); and means (11) adapted to transmit a first radio signal to a User Equipment, UE, the first radio signal comprising the created probing pilot multiplied with the beam-forming vector weight (W).

Example embodiment N2: The network node (10) according to example embodiment N1, comprising:

means (12, 13) adapted to select the beam-forming vector weight (W) from a list of available beam-forming vector weights; and means (12, 13) adapted to multiply the selected beam-forming vector weights (W) with the probing pilot.

Example embodiment N3: The network node (10) according to example embodiment N2, wherein the list of available beam-forming vector weights is provided in a pre-defined codebook (14) which is accessible by the network node (10).

Example embodiment N4: The network node (10) according to example embodiment N1, N2 or N3, further comprising:

means (11) adapted to receive a second radio signal from the UE, the second radio signal comprising channel quality feedback information (e.g. a Channel Quality Indicator (CQI)).

Example embodiment N5: The network node (10) according to example embodiment N4, further comprising:

means (11) adapted to transmit, to the UE, a demodulation pilot (e.g., a D-CPICH) multiplied with said beam-forming vector weight.

Example embodiment N6: The network node (10) according to example embodiment N4 or N5, further comprising:

means (11) adapted to transmit, to the UE, a data traffic channel (e.g., a HS-PDSCH) multiplied with said beam-forming vector weight.

Example embodiment N7: The network node (10) according to example embodiment N4, N5 or N6, further comprising:

means (11) adapted to transmit, to the UE, a control channel (e.g., a HS-SCCH) multiplied with said beam-forming vector weight.

Example embodiment N8: A network node (10) configured to operate in a combined radio cell, the network node (10) comprising:

means (12, 13) adapted to create a first probing pilot (e.g., F-CPICH¹) which is multiplied with a first beam-forming vector weight ($W_1$) of a list of available beam-forming vector weights;

means (11) adapted to transmit a first radio signal to a User Equipment, UE, the first radio signal comprising the created first probing pilot multiplied with the first beam-forming vector weight ($W_1$);

means (11) adapted to receive a second radio signal from the UE, the second radio signal comprising channel quality feedback information (e.g. a Channel Quality Indicator ($CQI_1$)) related to the first probing pilot multiplied with the first beam-forming vector weight ($W_1$);

means (12, 13) adapted to create a second probing pilot (e.g., F-CPICH[1]) which is multiplied with a second beam-forming vector weight ($W_2$) of the list of available beam-forming vector weights;

means (11) adapted to transmit a third radio signal to the UE, the third radio signal comprising the created second probing pilot multiplied with the second beam-forming vector weight ($W_2$);

means (11) adapted to receive a fourth radio signal from the UE, the fourth radio signal comprising channel quality feedback information (e.g. a $CQI_2$) related to the second probing pilot multiplied with the second beam-forming vector weight ($W_2$);

means (12, 13) adapted to rank the beam-forming vector weights ($W_1$, $W_2$) of the list of available beam-forming vector weights on the basis of the received channel quality feedback information (e.g. $CQI_1$, $CQI_2$);

means (12, 13) adapted to select one beam-forming vector weight from the list of available beam-forming vector weights on the basis of the ranking of the beam-forming vector weights; and means (11) adapted to subsequently utilize only the selected beam-forming vector weight.

Example embodiment N9: The network node (10) according to example embodiment N8, comprising:

means (11) adapted to transmit, to the UE, a demodulation pilot (e.g., a D-CPICH) multiplied with the selected beam-forming vector weight; and/or means (11) adapted to transmit, to the UE, a data traffic channel (e.g., a HS-PDSCH) multiplied with the selected beam-forming vector weight; and/or means (11) adapted to transmit, to the UE, a control channel (e.g., a HS-SCCH) multiplied with the selected beam-forming vector weight.

Example embodiment N10: The network node (10) according to example embodiment N8 or N9, further comprising:

means (12, 13) adapted to creating a N:th probing pilot which is multiplied with a N:th beam-forming vector weight ($W_N$) of the list of available beam-forming vector weights;

means (11) adapted to transmit another radio signal to the UE, the another radio signal comprising the created N:th probing pilot multiplied with the N:th beam-forming vector weight ($W_N$);

means (11) adapted to receive yet another radio signal from the UE, the yet another radio signal comprising channel quality feedback information (e.g. a $CQI_N$) related to the N:th probing pilot multiplied with the N:th beam-forming vector weight ($W_N$);

means (12, 13) adapted to rank the beam-forming vector weights ($W_1$, $W_2$, ..., $W_N$) of the list of available beam-forming vector weights on the basis of the received channel quality feedback information (e.g. $CQI_1$, $CQI_2$, ..., $CQI_N$);

means (12, 13) adapted to select one beam-forming vector weight from the list of available beam-forming vector weights on the basis of the ranking of all N beam-forming vector weights; and means (11) adapted to subsequently utilize only the selected beam-forming vector weight.

Example embodiment N11: The network node (10) according to example embodiment N10, comprising:

means (11) adapted to transmit, to the UE, a demodulation pilot (e.g., a D-CPICH) multiplied with the selected beam-forming vector weight; and/or means (11) adapted to transmit, to the UE, a data traffic channel (e.g., a HS-PDSCH) multiplied with the selected beam-forming vector weight; and/or means (11) adapted to transmit, to the UE, a control channel (e.g., a HS-SCCH) multiplied with the selected beam-forming vector weight.

Example embodiment N12: The network node (10) according to any one of example embodiments N8-N12, wherein the list of available beam-forming vector weights is provided in a pre-defined codebook (14) which is accessible by the network node (10).

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Furthermore, although specific terms may be employed herein, they are used in a generic and descriptive sense only and not for purposes of limitation. For example, while many of the embodiments described herein have been described using the term "probing pilot(s)", persons skilled in the art will appreciate that the term "channel state information-reference signal(s) (CSI-RS)" could be used as an alternative term. In fact, the term "probing pilot(s)" is sometimes used in HSPA, whereas the term CSI-RS is sometimes used in LTE. As another alternative, the term "Channel Quality Sounding Reference Signal" (or simply "reference signal") could be used to denote a probing pilot and/or a CSI-RS. Still further, many of the embodiments herein have been described by reference to F-CPICH and/or D-CPICH, which are sometimes used in HSPA. However, those skilled in the art will appreciate that the embodiments described herein are also applicable to other technologies (e.g. LTE, and/or LTE-Advanced) which use multiple network nodes (or, antennas).

What is claimed is:

1. A method performed by a network node operating in a combined radio cell, the method comprising:

creating a first probing pilot which is multiplied with a first beam-forming vector weight of a list of available beam-forming vector weights;

transmitting a first radio signal to a User Equipment (UE), the first radio signal comprising the created first probing pilot multiplied with the first beam-forming vector weight;

receiving a second radio signal from the UE, the second radio signal comprising channel quality feedback information related to the first probing pilot multiplied with the first beam-forming vector weight;

creating a second probing pilot which is multiplied with a second beam-forming vector weight of the list of available beam-forming vector weights;

transmitting a third radio signal to the UE, the third radio signal comprising the created second probing pilot multiplied with the second beam-forming vector weight;

receiving a fourth radio signal from the UE, the fourth radio signal comprising channel quality feedback information related to the second probing pilot multiplied with the second beam-forming vector weight;

ranking the beam-forming vector weights of the list of available beam-forming vector weights on the basis of the received channel quality feedback information related to the first probing pilot and the received channel quality feedback information related to the second probing pilot;

selecting one beam-forming vector weight from the list of available beam-forming vector weights on the basis of the ranking of the beam-forming vector weights; and utilizing only the selected beam-forming vector weight.

2. The method according to claim 1, wherein utilizing only the selected beam-forming vector weight comprises transmitting, to the UE, at least one of:
   a demodulation pilot multiplied with the selected beam-forming vector weight;
   a data traffic channel multiplied with the selected beam-forming vector weight; or
   a control channel multiplied with the selected beam-forming vector weight.

3. The method according to claim 1, further comprising:
   creating a N:th probing pilot which is multiplied with a N:th beam-forming vector weight of the list of available beam-forming vector weights;
   transmitting another radio signal to the UE, the another radio signal comprising the created N:th probing pilot multiplied with the N:th beam-forming vector weight;
   receiving a subsequent radio signal from the UE, the subsequent radio signal comprising channel quality feedback information related to the N:th probing pilot multiplied with the N:th beam-forming vector weight;
   ranking the beam-forming vector weights of the list of available beam-forming vector weights on the further basis of the received channel quality feedback information related to the N:th probing pilot;
   selecting one beam-forming vector weight from the list of available beam-forming vector weights on the basis of the ranking of all N beam-forming vector weights; and
   subsequently utilizing only the selected beam-forming vector weight.

4. The method according to claim 3, wherein utilizing only the selected beam-forming vector weight comprises transmitting, to the UE, at least one of:
   a demodulation pilot multiplied with the selected beam-forming vector weight;
   a data traffic channel multiplied with the selected beam-forming vector weight; or
   a control channel multiplied with the selected beam-forming vector weight.

5. The method according to claim 1, wherein the list of available beam-forming vector weights is provided in a pre-defined codebook which is accessible by the network node.

6. A network node configured to operate in a combined radio cell, the network node comprising:
   a transmitter;
   a receiver;
   a processor; and
   a memory, wherein the memory comprises instructions executable by said processor whereby said network node is operative to:
      create a first probing pilot which is multiplied with a first beam-forming vector weight of a list of available beam-forming vector weights;
      transmit a first radio signal to a User Equipment (UE), the first radio signal comprising the created first probing pilot multiplied with the first beam-forming vector weight;
      receive a second radio signal from the UE, the second radio signal comprising channel quality feedback information related to the first probing pilot multiplied with the first beam-forming vector weight;
      create a second probing pilot which is multiplied with a second beam-forming vector weight of the list of available beam-forming vector weights;
      transmit a third radio signal to the UE, the third radio signal comprising the created second probing pilot multiplied with the second beam-forming vector weight;
      receive a fourth radio signal from the UE, the fourth radio signal comprising channel quality feedback information related to the second probing pilot multiplied with the second beam-forming vector weight;
      rank the beam-forming vector weights of the list of available beam-forming vector weights on the basis of the received channel quality feedback information related to the first probing pilot and the received channel quality feedback information related to the second probing pilot;
      select one beam-forming vector weight from the list of available beam-forming vector weights on the basis of the ranking of the beam-forming vector weights; and
      subsequently utilize only the selected beam-forming vector weight.

7. The network according to claim 6, wherein the memory comprises instructions executable by said processor whereby said network node is operative to transmit, to the UE, at least one of:
   a demodulation pilot multiplied with the selected beam-forming vector weight;
   a data traffic channel multiplied with the selected beam-forming vector weight; or
   a control channel multiplied with the selected beam-forming vector weight.

8. The network node according to claim 6, wherein the memory comprises instructions executable by said processor whereby said network node is operative to:
   create a N:th probing pilot which is multiplied with a N:th beam-forming vector weight of the list of available beam-forming vector weights;
   transmit another radio signal to the UE, the another radio signal comprising the created N:th probing pilot multiplied with the N:th beam-forming vector weight;
   receive a subsequent radio signal from the UE, the subsequent radio signal comprising channel quality feedback information related to the N:th probing pilot multiplied with the N:th beam-forming vector weight;
   rank the beam-forming vector weights of the list of available beam-forming vector weights on the further basis of the received channel quality feedback information related to the N:th probing pilot;
   select one beam-forming vector weight from the list of available beam-forming vector weights on the basis of the ranking of all N beam-forming vector weights; and
   subsequently utilize only the selected beam-forming vector weight.

9. The network node according to claim 8, wherein the memory comprises instructions executable by said processor whereby said network node is operative to transmit, to the UE, at least one of:
   a demodulation pilot multiplied with the selected beam-forming vector weight;
   a data traffic channel multiplied with the selected beam-forming vector weight; or a control channel multiplied with the selected beam-forming vector weight.

10. The network node according to claim 6, wherein the list of available beam-forming vector weights is provided in a pre-defined codebook which is accessible by the network node.

* * * * *